United States Patent [19]

Mahr et al.

[11] Patent Number: 5,998,562
[45] Date of Patent: Dec. 7, 1999

[54] PERMANENT ORGANOSILICON COMPOUNDS, THEIR PREPARATION AND USE

[75] Inventors: Guenter Mahr; Jochen Dauth; Bernward Deubzer, all of Burghausen; Monika Ott, Haiming; Petra Gratzl, Tuessling; Hans Lautenschlager, Haiming, all of Germany

[73] Assignee: Wacker-Chemie GmbH, Munich, Germany

[21] Appl. No.: 08/888,934

[22] Filed: Jul. 7, 1997

[30] Foreign Application Priority Data

Jul. 11, 1996 [DE] Germany .......................... 198 28 017

[51] Int. Cl.$^6$ ................................................. C08G 77/08
[52] U.S. Cl. ............................. 528/21; 528/27; 528/38; 528/36; 544/218; 556/407; 8/190; 8/94.1 R; 8/DIG. 1
[58] Field of Search ................................ 528/27, 21, 38, 528/36; 544/218; 556/407; 8/190, DIG. 1, 94.1 R

[56] References Cited

U.S. PATENT DOCUMENTS

| | | | |
|---|---|---|---|
| 2,949,434 | 8/1960 | Bailey et al. | 260/45.2 |
| 3,294,566 | 12/1966 | Cooper | 106/287 |
| 3,884,875 | 5/1975 | Kim et al. | 260/46.5 E |
| 4,187,377 | 2/1980 | Narisawa et al. | 544/219 |
| 4,220,765 | 9/1980 | Findeisen | 544/179 |
| 4,292,434 | 9/1981 | Lindner et al. | 556/479 |
| 5,185,445 | 2/1993 | Meuwly et al. | 544/216 |
| 5,393,859 | 2/1995 | Bernheim et al. | 528/27 |
| 5,712,391 | 1/1998 | Ohno et al. | 544/194 |
| 5,837,792 | 11/1998 | Meuwly et al. | 528/27 |

FOREIGN PATENT DOCUMENTS

| | | |
|---|---|---|
| 0110370 | 4/1987 | European Pat. Off. . |
| 0628591 | 12/1994 | European Pat. Off. . |
| 1595789 | 2/1970 | Germany . |

OTHER PUBLICATIONS

Derwent Abstract corresponding to EP 0628591 (#95015098103).
Derwent Abstract corresponding to DE 1595789 (#6801227 Q 100).

Primary Examiner—Margaret W. Glass Moore
Attorney, Agent, or Firm—Brooks & Kushman P.C.

[57] ABSTRACT

The present invention relates to triazine-containing organosilicon compounds having units of the formula $$A_a R_b X_c SiO_{(4-a-b-c)/2} \quad (I),$$

where
R is identical or different and denotes a hydrogen atom or a monovalent substituted or unsubstituted hydrocarbon radical, having 1 to 26 carbon atoms, preferably 1 to 18 per radical,
X is identical or different and is a halogen atom, a chlorine atom or a radical of the formula —OR$^1$, where R$^1$ denotes an alkyl radical, having 1 to 18 carbon atoms, preferably 1 to 8 per radical and which may be substituted by an ether oxygen atom,
a is 0 or 1, preferably 0.01–0.5
b is 0, 1, 2 or 3, preferably 0.5–3.0
c is 0, 1, 2 or 3, preferably 0.0–2.0 and the sum $a+b+c \leq 4$, preferably 0.1–3.5, and
A is a radical of the formula

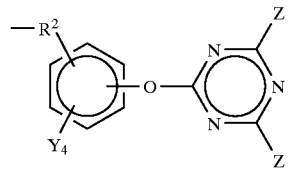

(II)

where
R$^2$ is an unbranched or branched, optionally substituted alkylene radical, having 1 to 18, preferably 1 to 12, carbon atoms,
Y is identical or different and denotes a hydrogen atom or an unbranched or branched alkyl radical, having 1 to 12, preferably 1 to 8, carbon atoms or denotes a radical of the formula —OR$^1$, where R$^1$ has the meaning given above, and
Z is identical or different and denotes X, —NR$_2$, —(O)CR or —SR, where X and R have the meanings given above with the proviso that at least one radical A containing at least one halogen atom, preferably a chlorine atom, is present per polymer molecule.

15 Claims, No Drawings

PERMANENT ORGANOSILICON COMPOUNDS, THEIR PREPARATION AND USE

BRIEF SUMMARY OF THE INVENTION

The present invention relates to triazine-containing organosilicon compounds, a process for their preparation and their use.

BACKGROUND OF THE INVENTION

Organopolysiloxanes containing substituted 1,3,5-triazine units are already known. For example, U.S. Pat. No. 2,949,434 (issued on Aug. 16, 1960, Bailey, Snyder and Pike, Union Carbide Corp.) describes a number of organopolysiloxanes containing dichlorotriazine units, synthesized by reacting amine-containing organopolysiloxanes with cyanuric chloride. Similar structures are disclosed in EP 628591 A2 (laid open on May 28, 1994, Bernheim, Chrobaczek and Messner, Pfersee Chemie GmbH).

In the synthesis of triazine-containing organopolysiloxanes based on organopolysiloxanes containing amine groups, the amine functions represent competing bases in the trapping of the hydrogen chloride being formed. The resulting polar ammonium structures, on the one hand, lead to high viscosities of the silicone oil and, on the other hand, promote the solubility of unreacted cyanuric chloride in the silicone oil, which is undesirable. The most serious disadvantage of the described organopolysiloxanes is that oils of this type still contain process-related amine groups which react with chlorotriazinyl groups during storage and thus lead to crosslinking of the silicone oil, where the crosslinked oil may become solid.

U.S. Pat. No. 3,294,566 (issued on Dec. 27, 1966, Cooper, Midland Silicones Ltd) describes a composition which gives water-repellant action to fibrous materials, which composition comprises organosilanes and/or organopolysiloxanes containing amine or aliphatic hydroxyl groups and cyanuric chloride.

To those skilled in the art it is known that, in the hydrosilylation of unsaturated aliphatic alcohols, hydrolyzable SiO-alkyl links form in a side reaction, which links are undesirable. In addition, hydroxyalkyl groups on organopolysiloxanes, owing to the relatively high pKs of the aliphatic alcohol functions, are difficult to convert by strong bases to the corresponding alkoxides, which ensure a rapid nucleophilic substitution reaction of cyanuric chloride with elimination of salt. Finally, the 3-buten-1-ol used in U.S. Pat. No. 3,294,566 has relatively low boiling and flash points and has been declared to be an irritant.

DETAILED DESCRIPTION OF THE INVENTION

The object of the present invention was to provide organopolysiloxanes which can be prepared in a simple process using readily accessible starting materials which do not have the above mentioned disadvantages.

The present invention relates to triazine-containing organosilicon compounds having units of the formula $$A_a R_b X_c SiO_{(4-a-b-c)/2} \tag{I},$$

where
R is identical or different and denotes a hydrogen atom or a monovalent optionally substituted hydrocarbon radical, having 1 to 26 carbon atoms, preferably 1 to 18 per radical, X is identical or different and is a halogen atom, a chlorine atom or a radical of the formula —OR$^1$, where R$^1$ denotes an alkyl radical, having 1 to 18 carbon atoms, preferably 1 to 8 per radical where the alkyl radical may be substituted by an ether oxygen atom, a is 0 or 1, preferably 0.01–0.5 b is 0, 1, 2 or 3, preferably 0.5–3.0 c is 0, 1, 2 or 3, preferably 0.0–2.0 and the sum a+b+c≦4, preferably 0.1–3.5, and A is a radical of the formula

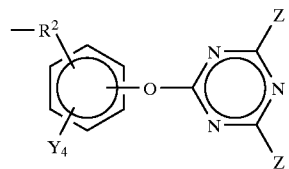

(II)

where
R$^2$ is an unbranched or branched, optionally substituted alkylene radical, having 1 to 18, preferably 1 to 12, carbon atoms, Y is identical or different and denotes a hydrogen atom or an unbranched or branched alkyl radical, having 1 to 12, preferably 1 to 8, carbon atoms or denotes a radical of the formula —OR$^1$, where R$^1$ has the meaning given above, and Z is identical or different and denotes X, —NR$^2$, —(O)CR or —SR, where X and R have the meanings given above with the proviso that at least one radical A containing at least one halogen atom, preferably a chlorine atom, is present per compound molecule.

The organosilicon compounds according to the invention have a mean molecular weight of 400 to 1,000,000 g/mol, preferably 400 to 150,000 g/mol, and have a viscosity of 10 to 1,000,000 mm$^2$/s at 25° C., preferably 20 to 100,000 mm$^2$/s at 25° C.

The present invention further relates to a process for preparing triazine-containing organosilicon compounds, which comprises reacting, organosilicon compounds having units of the formula $$B_a R_b X_c SiO_{(4-a-b-c)/2} \tag{III},$$

where
B is a radical of the formula

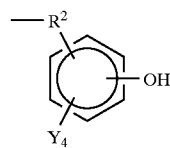

(IV)

and R, R$^2$ X, Y, a, b and c have the specified meanings, with optionally substituted cyanuric halide, preferentially cyanuric chloride, using bases.

Useful bases include amines, such as triethylamine, triisooctylamine, pyridine, diethylamine, piperazine and inorganic bases, such as potassium hydroxide, sodium hydroxide, cesium hydroxide, calcium hydroxide, sodium carbonate and sodium hydrogen carbonate, and sodium methoxide.

Examples of radicals R are alkyl radicals, such as methyl, ethyl, n-propyl, isopropyl, 1-n-butyl, 2-n-butyl, isobutyl, tert-butyl, n-pentyl, isopentyl, neopentyl, tert-pentyl; hexyl radicals, such as n-hexyl; heptyl radicals, such as n-heptyl; octyl radicals, such as n-octyl and isooctyl radicals such as 2,2,4-trimethyl-pentyl; nonyl radicals, such as n-nonyl; decyl radicals, such as n-decyl; dodecyl radicals, such as n-dodecyl; octadecyl radicals, such as n-octadecyl; cycloalkyl radicals, such as cyclopentyl, cyclohexyl, cycloheptyl and methylcyclohexyls; aryl radicals, such as phenyl, naphthyl, anthryl and phenanthryl; alkaryl radicals, such as o-, m-, p-tolyl radicals; xylyl radicals and ethylphenyl radicals; and aralkyl radicals, such as benzyl, α- and β-phenylethyl. Preference is given to the methyl radical.

Examples of halogenated radicals R are haloalkyl radicals, such as 3,3,3-trifluoro-n-propyl, 2,2,2,2',2', 2'-hexafluoroisopropyl, heptafluoroisopropyl and haloaryl radicals, such as o-, m- and p-chlorophenyl.

Examples of substituted radicals R are the 3-(3-methoxy-4-hydroxyphenyl)propyl and 3-(2-hydroxy-phenyl)propyl radicals.

Examples of alkyl radicals $R^1$ are methyl, ethyl, n-propyl, isopropyl, 1-n-butyl, 2-n-butyl, isobutyl and tert-butyl. Preference is given to the methyl and ethyl radicals. Examples of alkyl radicals $R^1$ which are substituted by an ether oxygen atom are methoxyethyl and ethoxyethyl.

Examples of radical $R^2$ are alkylene radicals of the formulae —CH$_2$CH$_2$—, —CH$_2$CH$_2$CH$_2$—, —CH(CH$_3$)CH$_2$—, —CH$_2$CH(CH$_3$)CH$_2$ and substituted alkylene radicals of the formulae —CH$_2$CH$_2$CH$_2$O—, —CH$_2$CH$_2$CH$_2$OC(O)—, —CH$_2$CH$_2$CH$_2$NH—, —CH$_2$CH(CH$_3$)CH$_2$O—, —CH$_2$CH(CH$_3$) CH$_2$OC(O)—, —CH$_2$CH(CH$_3$)CH$_2$NH—, —CH$_2$CH$_2$CH$_2$S— and —CH$_2$CH$_2$CH$_2$NHC(O)—.

Preference is given to the radicals —CH$_2$CH$_2$CH$_2$— and —CH(CH$_3$)CH$_2$—.

Preferred radicals for Y are hydrogen and the methoxy radical.

Preferred radicals for Z are chlorine and the methoxy radical.

Examples of radicals A are

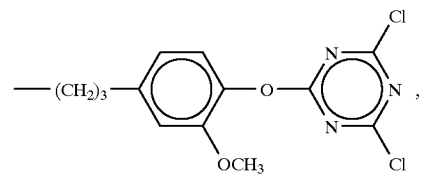

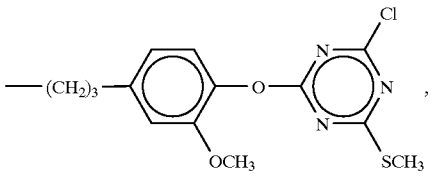

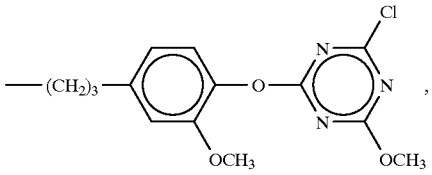

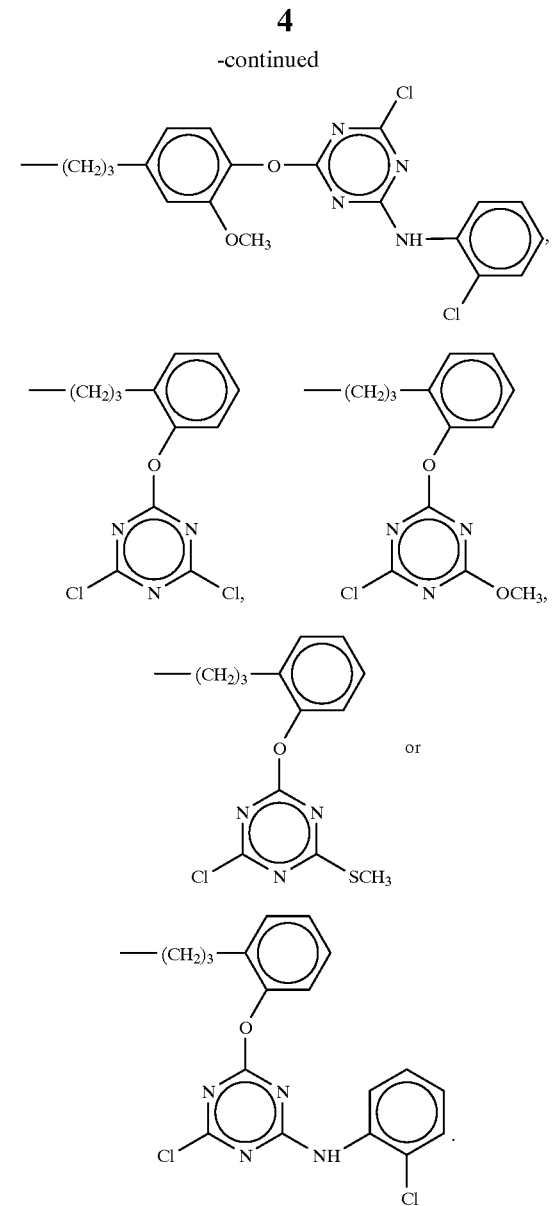

Preferred radicals for A are

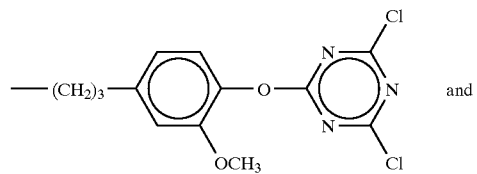

and

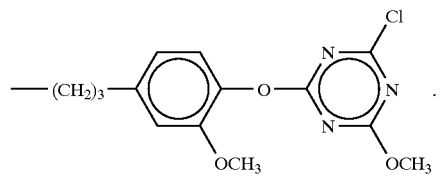

Preferred triazine-containing organosilicon compounds are those of the formula $$A_dR_{3-d}SiO(SiR_2O)_e(SiRAO)_fSiR_{3-d}A_d \qquad (V),$$

where A and R have the meanings specified above, d is 0 or 1 e is 0 or an integer from 1 to 1500, preferably 5–1500 and f is 0 or an integer from 1 to 200, preferably 1–150, with the proviso that at least one radical A containing at least one halogen atom, preferably a chlorine atom, is present per compound molecule.

To synthesize the precursor (III) and the preferred precursors containing units of the formula $$B_dR_{3-d}SiO(SiR_2O)_e(SiRBO)_fSiR_{3-d}B_d \quad (VI),$$

where B, R, d, e and f have the meanings specified above, with the proviso that at least one radical B is present per polymer molecule, by a hydrosilylation reaction, preferentially, use is made of organosilicon compounds having at least one Si-bonded hydrogen atom per organopolysiloxane of the formula $$H_aR_bX_cSiO_{(4-a-b-c)/2} \quad (VII),$$

where R, X, a, b and c have the meanings specified above.

The organopolysiloxanes having at least one Si-bonded hydrogen atom contain at least 0.02% by weight, preferably 0.05% to 1.65% by weight, of Si-bonded hydrogen, and their mean viscosity is 5 to 20,000 mm²/s at 25° C., preferably 10 to 2000 mm²/s at 25° C., more preferably 10 to 1000 mm²/s at 25° C.

As organopolysiloxanes having at least one Si-bonded hydrogen atom per molecule, use is made of those of the formula $$H_dR_{3-d}SiO(SiR_2O)_e(SiRHO)_fSiR_{3-d}H_d \quad (VIII),$$

where R, d, e and f have the meanings specified above.

Processes for preparing organopolysiloxanes having at least one Si-bonded hydrogen atom per molecule, even those of the preferred type, are generally known.

To prepare the precursor III, use is made of hydroxyaryl components of the formula

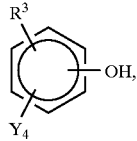

(IVa)

where

R³ denotes an unbranched or branched optionally substituted alkenyl radical, having 1 to 18, preferably 2 to 12, carbon atoms.

Examples of R³ are CH₂=CH—, CH₂=CHCH₂—, CH₂=C(CH₃)—, CH₂=C(CH₃)CH₂—, CH₂=CH(CH₂)₉— and substituted alkenyl radicals of the formula CH₂=CHCH₂O—, CH₂=CHCH₂OC(O)—, CH₂=CHCH₂NH—, CH₂=C(CH₃)CH₂O—, CH₂=C(CH₃)CH₂OC(O)—, CH₂=C(CH₃)CH₂NH—, CH₂=CHCH₂S— and CH₂=CHCH₂NHC(O)—.

A preferred hydroxyaryl component (IVa) for preparing the precursor (III) by a hydrosilylation reaction is commercially available from Haarmann & Reimer, under the name Eugenol (4-allyl-2-methoxyphenol) and, in comparison with unsaturated alcohols, such as 3-buten-1-ol, has a lower volatility, a higher flashpoint, a higher acid strength and a lower toxicity. Eugenol is even approved for the food sector.

Unsaturated hydroxyaryl compounds are preferably used in the hydrosilylation reaction in amounts such that 1 to 2 mole, preferably 1.05 to 1.50 mole, of organic compound is present per gram atom of Si-bonded hydrogen in the organosilicon compound (VI).

The precursors (III) and (VI) are disclosed, e.g., by DE-A 1 595 789 (laid open Feb. 12, 1970, Krantz, General Electric Co.).

As catalysts promoting the addition of Si-bonded hydrogen to an aliphatic multiple bond, use can also be made in the process according to the invention of the same catalysts which could previously be used to promote the addition of Si-bonded hydrogen to aliphatic multiple bonds. The catalysts are preferably a metal selected from the group consisting of the platinum metals or a compound or a complex of a metal selected from the group consisting of the platinum metals.

Examples of catalysts of this type are preferably metallic and finely divided platinum, which may be situated on supports such as silicon dioxide, aluminum oxide or activated carbon, compounds or complexes of platinum, such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes including products of reaction between $H_2PtCl_6 \cdot 6H_2O$ and cyclohexanone, platinum-vinylsiloxane complexes, such as platinum-1,3-divinyl-1,1,3,3-tetramethyldisiloxane complexes with or without a detectable content of inorganically bound halogen, bis-(γ-picoline)platinum dichloride, trimethylenedipyridineplatinum dichloride, dicyclopentadieneplatinum dichloride, (dimethyl sulfoxide)ethyleneplatinum(II) dichloride, cyclooctadieneplatinum dichloride, norbornadieneplatinum dichloride, γ-picolineplatinum dichloride, cyclopentadieneplatinum dichloride and reaction products of platinum tetrachloride with olefin and primary amine or secondary amine or primary and secondary amine according to U.S. Pat. No. 4,292,434, such as the reaction product of platinum tetrachloride, dissolved in 1-octene, with sec-butyl-amine, or ammonium-platinum complexes according to EP-B 1 10 370; preference is given to $[Rh(Cl)\{P(C_6H_5)_3\}_3]$, $H_2PtCl_6 \cdot 6H_2O$, platinum-olefin complexes and platinum-vinylsiloxane complexes.

The catalyst is used in amounts of 2 to 200 ppm by weight (parts by weight per million parts by weight), preferably in amounts of 5 to 50 ppm by weight, in each case calculated as elemental platinum and based on the total weight of organic compound and organosilicon compound.

The process according to the invention is carried out at the pressure of the ambient atmosphere, that is at about 1020 hPa (absolute), but it can also be carried out at higher or lower pressures. Furthermore, the process according to the invention is carried out at a temperature of 30° C. to 150° C., preferably 50° C. to 120° C.

In the process according to the invention an inert organic solvent or mixture of solvents can be used, although the use of inert organic solvents is not preferred. Examples of inert organic solvents are toluene, xylene, isophorone, octane isomers, butyl acetate, isopropanol and dimethoxyethane.

Excess organic compound and any inert organic solvent used are removed by distillation from the hydroxyaryl-containing organosilicon compounds prepared by the process according to the invention.

In the process according to the invention substituted or unsubstituted cyanuric halide of the formula

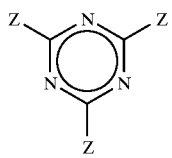

(IX)

is esterified with the described precursors of formula (III) or the preferred precursors of formula (VI), with addition of base or mixtures of bases, where Z has the meaning specified above.

In the process according to the invention 0.5 to 6 mole of substituted or unsubstituted cyanuric halide of formula (IX), preferably 0.5 to 3 mole of substituted or unsubstituted cyanuric chloride, and preferably 1 to 2 mole of substituted or unsubstituted cyanuric chloride, are used per mole of hydroxyl group. The amine hydrochlorides or salts which may be produced in the process according to the invention are removed by filtration, acidic, basic or neutral filter aids being able to be used in the filtration.

The process according to the invention is carried out at the pressure of the ambient atmosphere, that is at about 1020 hPa (absolute), but it can also be carried out at higher or lower pressures. Furthermore, the process according to the invention is carried out at a temperature of −20° C. to 120° C., preferably −10° C. to 100° C.

In the process according to the invention inert organic solvents can be used. The use of polar organic solvents is preferred. Examples of inert organic solvents are toluene, xylene, isophorone, octane isomers, butyl acetate, isopropanol, dimethylethylene glycol, tetrahydrofuran and dioxane.

The triazine-containing organosilicon compounds obtained by the process according to the invention can also contain non-esterified hydroxyaryl groups.

Furthermore, in the process according to the invention, non-esterified hydroxyl groups of the organosilicon compounds (III) or (VI) can be further reacted, by carboxylating agents such as acetic anhydride, diketene and dihydropyran.

Excess organic compound (IX) is removed by sublimation or by filtration from the triazine-containing organosilicon compounds prepared by the process according to the invention, and excess carboxylating agent and any inert organic solvent which may have been used is removed by distillation.

The invention further relates to a process for equilibrating the triazine-containing organosilicon compounds according to the invention, with the triazine-containing organosilicon compounds being equilibrated with organopolysiloxanes selected from the group consisting of unbranched organopolysiloxanes having terminal triorganosiloxy groups, unbranched organopolysiloxanes having terminal hydroxyl groups, cyclic organopolysiloxanes and mixed polymers of diorganosiloxane and monoorganosiloxane units.

Preferentially, unbranched organopolysiloxanes containing terminal triorganosiloxy groups, are those of the formula $$R_3SiO(SiR_2O)_mSiR_3 \quad (X)$$

where R has the meaning specified above and m is 0 or an integer in the range from 1 to 1500, preferably 5–1000. Unbranched organopolysiloxanes having terminal hydroxyl groups, are those of the formula $$HO(SiR_2O)_nH \quad (XI)$$

where R has the meaning specified above and n is an integer from 1 to 1500, preferably 5–1000, as cyclic organopolysiloxanes, use is made of those of the formula $$(SiR_2O)_o \quad (XII),$$

where R has the meaning specified above and o is an integer from 3 to 12, preferably 3–8, and as mixed polymers, use is made of those of units of the formula $$R_2SiO \text{ and } RSiO_{3/2} \quad (XIII),$$

where R has the meaning specified above.

The ratios of the triazine-containing organopolysiloxanes and the organopolysiloxanes used in the equilibration which may have taken place are determined solely by the desired proportion of triazine groups in the organopolysiloxanes produced in the equilibration which may have been carried out and by the desired mean chain length.

In the equilibration which may have been carried out acid catalysts, which promote the equilibration, are used. Examples of catalysts of this type are sulfuric acid, phosphoric acid, trifluoromethanesulfonic acid, phosphonitrilic chlorides and acidic catalysts which are solid under the reaction conditions, such as acid-activated bleaching earth, acid zeolites, sulfonated coal and sulfonated styrene/divinylbenzene mixed polymer. Preference is given to phosphonitrilic chlorides. Phosphonitrilic chlorides are used in amounts of 5 to 1000 ppm by weight (parts by weight per million parts by weight), preferably 50 to 200 ppm by weight, in each case based on the total weight of the organosilicon compounds used. Although the use of basic equilibration catalysts is possible, it is not preferred.

If the composition is equilibrated the equilibration is carried out at 80° C. to 150° C., preferably 80° C. to 140° C. and at the pressure of the ambient atmosphere, that is at about 1020 hPa (absolute). However, if desired, higher or lower pressures can also be used. The equilibration is carried out in a water-immiscible solvent, such as toluene, in 5% to 20% by weight, based on the total weight of the particular organosilicon compound used.

Before the mixture obtained in the equilibration is worked up, the catalyst can be inactivated.

The process according to the invention can be carried out batchwise, semicontinuously or completely continuously.

The triazine-containing organosilicon compounds according to the invention are distinguished by their simple method of synthesis, their low SiOC content and their viscosity stability.

The invention further relates to a process for treating textile fabrics and leathers, which involves using triazine-containing organosilicon compounds according to the invention.

The organosilicon compounds according to the invention have a good feel, a low tendency to yellowing and enable substrates to be given a permanent finish. Said organosilicon compounds according to the invention preferentially serve for the treatment of textile fabrics, such as woven fabrics, knitted goods or nonwoven fabrics. The permanence of the effects with regard to washing processes is excellent, in particular in the case of textiles which comprise or consist of cellulose fibers or polyamide fibers. The invention further relates to textile fiber preparations and leather treatment.

EXAMPLE 1

A mixture of 88.5 g (0.539 mole) of Eugenol, 1000 g (0.490 mole of SiH) of an α,ω-hydrogen-polydimethylsiloxane of viscosity 67 mm²/s, 2.2 g (0.021 mole) of sodium carbonate and 3.651 ml (10 ppm of platinum) of a 1% strength solution of hexachloroplatinic acid in isopropanol was heated to 30° C. under an inert nitrogen atmosphere. After completion of the exothermic reaction, the reaction mixture was stirred for 1 hour at a temperature of 50° C. Volatile constituents were then removed at 120° C. and a reduced pressure of approximately 5 mbar. After cooling and subsequent filtration a brownish clear oil having a viscosity of 106 mm$^2$/s and a hydroxyl value of 27.41 mg of KOH/g was obtained.

Yield: 89.0% (of theory) (precursor I)

EXAMPLE 2

A mixture of 108.4 g (0.660 mole) of Eugenol, 2000 g (0.600 mole of SiH) of an α,ω-hydrogen-polydimethylsiloxane of viscosity 170 mm$^2$/s and 7.026 ml (10 ppm of platinum) of a 1% strength solution of hexachloroplatinic acid in isopropanol was heated to 30° C. under an inert nitrogen atmosphere. After completion of the exothermic reaction, the reaction mixture was stirred for 2 hours at a temperature of 50° C. Volatile constituents were then removed at 120° C. and a reduced pressure of approximately 5 mbar. After cooling and subsequent filtration, a brownish clear oil having a viscosity of 200 mm$^2$/s and a hydroxyl value of 17.06 mg of KOH/g was obtained.

Yield: 93.0% (of theory) (precursor II)

EXAMPLE 3

A solution of 346.9 g (2.113 mole) of Eugenol in 409.9 g of isopropanol was admixed with 8.25 g (0.078 mole) of sodium carbonate and heated to 80° C. under an inert nitrogen atmosphere. At this temperature, 13.013 ml (10 ppm of platinum) of a 1% strength solution of hexachloroplatinic acid in isopropanol were added. 3750 g (1.838 mole of SiH) of a polydimethylsiloxane of viscosity 69 mm$^2$/s having side-chain hydrogen groups were then added in the course of 65 minutes and the reaction mixture was stirred for 1 hour at a temperature of 90° C. Volatile constituents were then removed at 120° C. and a reduced pressure of approximately 5 mbar. After filtration and subsequent short-path distillation, a brownish clear oil having a viscosity of 309 mm$^2$/s and a hydroxyl value of 20.55 mg of KOH/g was obtained.

Yield: 79.7% (of theory) (precursor III)

EXAMPLE 4

A mixture of 27.1 g (0.202 mole) of 2-allylphenol, 500 g (0.185 mole of SiH) of a polydimethylsiloxane having side-chain hydrogen groups and 1.760 g (10 ppm) of a 1% strength solution of hexachloroplatinic acid in isopropanol was heated to 50° C. under an inert nitrogen atmosphere. After completion of exothermic reaction, the reaction mixture was stirred for 1 hour at a temperature of 65° C. Volatile constituents were then removed at 120° C. and a reduced pressure of approximately 5 mbar. After cooling and subsequent filtration, a brownish clear oil having a viscosity of 796 mm$^2$/s and a hydroxyl value of 16.66 mg of KOH/g was obtained.

Yield: 81.0% (of theory) (precursor IV)

EXAMPLE 5

200.0 g (0.098 mole of hydroxyl groups) of precursor I were admixed with 17.6 g of a 30% strength solution of NaOCH$_3$ in MeOH (0.098 mole of NaOCH$_3$) and stirred for 1 hour. Under an inert nitrogen atmosphere, this mixture was added in the course of 2 hours to a solution of 18.1 g (0.098 mole) of cyanuric chloride in 108.4 g of dimethoxyethane. The reaction mixture was then stirred for 1 hour at a temperature of 60° C. After cooling and filtration, all volatile constituents were removed at a temperature of up to 140° C. and a reduced pressure of approximately 5 mbar. After final filtration, a faintly greenish clear oil having a viscosity of 284 mm$^2$/s was obtained.

Yield: 47.6% (of theory)

EXAMPLE 6

A mixture of 1000 g (0.304 mole of hydroxyl groups) of precursor II, 52.0 g of a 30% strength solution of NaOCH$_3$ in MeOH (0.289 mole of NaOCH$_3$) and 105.2 g of dimethoxyethane was stirred for 1 hour at a temperature of 25° C. and then for 1 hour at a temperature of 60° C., under a nitrogen stream. The majority of the methanol was removed in a mixture with dimethoxyethane by distillation in the course of this. After addition of another 105.2 g of dimethoxyethane, this mixture was added in the course of 1.5 hours to a solution of 56.1 g (0.304 mole) of cyanuric chloride in 224.4 g of dimethoxyethane. The reaction mixture was then stirred for 1 hour at a temperature of 60° C and then stirred for 2 hours with cooling. All volatile constituents were then removed at a temperature of 140° C. and a reduced pressure of approximately 5 mbar. After final filtration, a faintly greenish slightly turbid oil having a viscosity of 271 mm$^2$/s was obtained.

Yield: 79.8% (of theory)

EXAMPLE 7

A mixture of 250 g (0.092 mole of hydroxyl groups) of precursor III, 15.6 g of a 30% strength solution of NaOCH$_3$ in MeOH (0.087 mole of NaOCH$_3$) and 26.6 g of dimethoxyethane was stirred for 1 hour at a temperature of 25° C. and was then stirred for 1 hour at a temperature of 60° C., under a nitrogen stream. The majority of the methanol was removed in a mixture with dimethoxyethane by distillation in the course of this. After addition of another 26.6 g of dimethoxyethane, this mixture was added to a solution of 16.9 g (0.092 mole) of cyanuric chloride in 67.7 g of dimethoxyethane in the course of 0.4 hours. The reaction mixture was then stirred for 1 hour at a temperature of 60° C. and was then stirred for 2 hours with cooling. All volatile constituents were then removed at a temperature of 140° C. and a reduced pressure of approximately 5 mbar. After final filtration, a faintly greenish clear oil having a viscosity of 278 mm$^2$/s was obtained.

Yield: 85.8% (of theory) (end product I according to the invention)

EXAMPLE 8

A mixture of 250 g (0.074 mole of hydroxyl groups) of precursor IV, 12.6 g of a 30% strength solution of NaOCH$_3$ in MeOH (0.070 mole of NaOCH$_3$) and 26.3 g of dimethoxyethane was stirred for 1 hour at a temperature of 25° C. and then for 1 hour at a temperature of 60° C., under a nitrogen stream. The majority of the methanol was removed in a mixture with dimethoxyethane by distillation in the course of this. After addition of another 26.3 g of dimethoxyethane, this mixture was added in the course of 0.4 hours to a solution of 13.6 g (0.074 mole) of cyanuric chloride in 54.4 g of dimethoxyethane. The reaction mixture was then stirred for 1 hour at a temperature of 60° C. and then stirred for 2 hours with cooling. All volatile constituents were then removed at a temperature of 140° C. and a reduced pressure of approximately 5 mbar. After final filtration, a weakly greenish clear oil having a viscosity of 780 mm²/s was obtained.

Yield: 69.2% (of theory)

COMPARISON EXAMPLE

The example below verifies the viscosity stability of the triazine-containing organosilicon compounds according to the invention in comparison with triazine-containing organosilicon compounds which are prepared from amino-functional organopolysiloxanes according to U.S. Pat. No. 2,949,434. The amino-functional organopolysiloxane used in this example is identical, with regard to its chain length and its functional density, to the hydroxyaryl-functional organopolysiloxane precursor III.

At a temperature of 50° C., under a nitrogen stream, a mixture of 250 g (0.115 mole of amine groups) of a polydimethylsiloxane of viscosity 146 mm²/s having side-chain amine groups, 250 ml of THF (tetrahydrofuran) and 25.81 g of a 25% solution of KOH in methanol (0.115 mole of KOH) was added to a solution of 21.21 g (0.115 mole) of cyanuric chloride in 70 ml of THF. The reaction mixture was then stirred for three hours at a temperature of 63° C. After filtration, all volatile constituents were removed at a temperature of 50° C. and a reduced pressure of approximately 5 mbar. After final filtration, a colorless clear oil having a viscosity of 175 mm²/s was obtained.

Yield: 79.1% (of theory) (end product II)

TABLE 1

Comparison between the viscosities and appearance of the end product I according to the invention and end product II during storage

| | Viscosity [mm²/s] | |
|---|---|---|
| Storage [days] | End product I | End product II |
| 0 | 278 | 175 |
| 7 | 287 | 387 |
| 15 | 283 | 2950 |
| 23 | 302 | 3300 |
| 40 | 314 | gels |
| 50 | 305 | — |
| 70 | 343 | — |
| Appearance after 70 days | clear | white, turbid |

What is claimed is:

1. A triazine-containing organosilicon compound, comprising units of the formula $$A_a R_b X_c SiO_{(4-a-b-c)/2} \quad (I),$$

where

R is identical or different and denotes a hydrogen atom or a monovalent optionally substituted hydrocarbon radical, X is identical or different and is a halogen atom or a radical of the formula —OR¹, where R¹ denotes an alkyl radical and is optionally substituted by an ether oxygen atom, a is 0 or 1, b is 0, 1, 2 or 3, c is 0, 1, 2 or 3, and the sum a+b+c≦4, and A is a radical of the formula $$\text{(II)}$$

$$-R^2-\underset{Y_4}{\underset{|}{\bigcirc}}-O-\underset{Z}{\underset{|}{\bigcirc}}\overset{Z}{\underset{N}{\underset{|}{\bigvee}}}$$

where

R² is an unbranched or branched, optionally substituted alkylene radical,

Y is identical or different and denotes a hydrogen atom or an unbranched or branched alkyl radical, or denotes a radical of the formula —OR¹, where R¹ has the meaning given above, and Z is identical or different and denotes X, —NR₂, —(O)CR or —SR, where X and R have the meanings given above with the proviso that at least one radical A containing at least one halogen atom is present per compound molecule.

2. The triazine-containing organosilicon compound as claimed in claim 1, wherein A is a radical of the formulae —(CH₂)₃—⟨benzene ring with OCH₃⟩—O—⟨triazine with two Cl⟩, —(CH₂)₃—⟨benzene ring with OCH₃⟩—O—⟨triazine with Cl and SCH₃⟩, —(CH₂)₃—⟨benzene ring with OCH₃⟩—O—⟨triazine with Cl and OCH₃⟩, —(CH₂)₃—⟨benzene ring with OCH₃⟩—O—⟨triazine with Cl and NH—chlorophenyl⟩, 3. The triazine-containing organosilicon compound as claimed in claim 1, wherein the organosilicon compound has the formula $$A_dR_{3-d}SiO(SiR_2O)_e(SiRAO)_fSiR_{3-d}A_d \qquad (V),$$

where
A and R have the meanings specified in claim 1,
d is 0 or 1,
e is 0 or an integer from 1 to 1500 and
f is 0 or an integer from 1 to 200,
with the proviso that at least one radical A having at least one halogen atom is present per compound molecule.

4. A process for preparing the triazine-containing organosilicon compound as claimed in claim 1, wherein organosilicon compounds having units of the formula $$B_aR_bX_cSiO_{(4-a-b-c)/2} \qquad (III),$$

where
B is a radical of the formula $$(IV)$$

and R, $R^2$, X, Y, a, b and c have the meanings, as specified in claim 1 are reacted with an optionally substituted cyanuric halide, and a base or mixture of bases.

5. The process for preparing the triazine-containing organosilicon compound as claimed in claim 4, wherein precursor (III) contains units of formula $$B_dR_{3-d}SiO(SiR_2O)_e(SiRBO)_fSiR_{3-d}B_d \qquad (VI),$$

where
B is a radical of the formula $$(IV)$$

R is identical or different and denotes a hydrogen atom or a monovalent optionally substituted hydrocarbon radical,
d is 0 or 1,
e is 0 or an integer from 1 to 1500 and
f is 0 or an integer from 1 to 200,
with the proviso that at least one radical B is present per compound molecule.

6. The process for preparing the triazine-containing organosilicon compound as claimed in claim 4, wherein the precursors (III) or (VI) are prepared by a hydrosilylation reaction with organosilicon compounds having at least one Si-bonded hydrogen atom per organopolysiloxane of the formula $$H_aR_bX_cSiO_{(4-a-b-c)/2} \qquad (VII),$$

where R, X, a, b and c have the meanings specified above, and an unsaturated hydroxyaryl compound.

7. The process for preparing the triazine-containing organosilicon compound as claimed in claim 6, wherein, as organosilicon compound having at least one Si-bonded hydrogen atom per organopolysiloxane, has the formula $$H_dR_{3-d}SiO(SiR_2O)_e(SiRHO)_fSiR_{3-d}H_d \qquad (VIII),$$

where
R is identical or different and denotes a hydrogen atom or a monovalent optionally substituted hydrocarbon radical,
d is 0 or 1,
e is 0 or an integer from 1 to 1500 and
f is 0 or an integer from 1 to 200.

8. The process as claimed in claim 4, wherein the triazine-containing organosilicon compound is further treated by equilibrating the triazine-containing organosilicon compounds with an organopolysiloxane or mixture of organopolysiloxanes selected from the group consisting of an unbranched organopolysiloxane having terminal triorganosiloxy groups, an unbranched organopolysiloxane having terminal hydroxyl groups, a cyclic organopolysiloxane and a mixed polymer of diorganosiloxane and monoorganosiloxane units.

9. The process as claimed in claim 8, wherein
A. the unbranched organopolysiloxanes are those of the formula $$R_3SiO(SiR_2O)_mSiR_3, \quad (X),$$

where
R is identical or different and denotes a hydrogen atom or a monovalent optionally substituted hydrocarbon radical,
m is 0 or an integer in the range from 1 to 1500, B. the unbranched organopolysiloxane having terminal hydroxyl groups, is made of units of the formula $$HO(SiR_2O)_nH \quad (XI),$$

where R has the meaning specified above and
n is an integer from 1 to 1500,

C. the cyclic organopolysiloxane, is made of units of the formula $$(SiR_2O)_o, \quad (XII),$$

where R has the meaning specified above and o is an integer from 3 to 12, and as mixed polymers, and D. the mixed polymer is made of units of the formula $$R_2SiO \text{ and } RSiO_{3/2} \quad (XIII),$$

where R has the meaning specified above.

10. A process for treating textile fabrics, where the triazine-containing organosilicon compounds of claim 1 is applied to the textile.

11. A process for treating leather where the triazine-containing organosilicon compound of claim 1 is applied to the leather.

12. The organosilicon compound as claimed in claim 1, where
a averages 0.01 to 1.0,
b averages 0.0 to 3.0, and
c averages 0.0 to 3.0.

13. A process for preparing the triazine-containing organosilicon compound as claimed in claim 2, wherein organosilicon compounds having units of the formula $$B_aR_bX_cSiO_{(4-a-b-c)/2} \quad (III),$$

where B is a radical of the formula

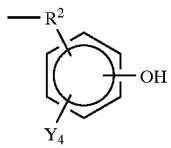

(IV)

and are reacted with a polymer with an optionally substituted cyanuric halide, and a base or mixture of bases.

14. A process for preparing the triazine-containing organosilicon organosilicon compound as claimed is claim 3, wherein organosilicon compounds having unit of the formula $$B_aR_bX_cSiO_{(4-a-b-c)/2} \quad (III),$$

where B is a radical of the formula

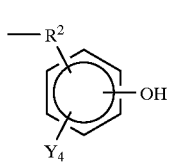

(IV)

and are reacted with a polymer with an optionally substituted cyanuric halide, and a base or mixture of bases.

15. The process for preparing the triazine-containing organosilicon compound as claimed in claim 5, wherein the precursors (III) or (VI) are prepared by a hydrosilylation reaction with organosilicon compounds having at least one Si-bonded hydrogen atom per organopolysiloxane of the formula $$H_aR_bX_cSiO_{(4-a-b-c)/2} \quad (VII),$$

where R, X, a, b and c have the meanings specific above, and an unsaturated hydroxyaryl compound.

* * * * *

UNITED STATES PATENT AND TRADEMARK OFFICE
CERTIFICATE OF CORRECTION

PATENT NO. : 5,998,562
DATED : December 7, 1999
INVENTOR(S) : Guenter Mahr et al.

It is certified that error appears in the above-identified patent and that said Letters Patent is hereby corrected as shown below:

Column 16, Line 19, Claim 14, delete "organosilicon organosilicon compound" and insert therefor --organosilicon compound--.

Column 16, Line 20, Claim 14, delete unit" and insert therefor --units--.

Signed and Sealed this

Eighteenth Day of July, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,998,562
DATED : December 7, 1999
INVENTOR(S) : GUENTER MAHR ET AL.

It is certified that error appears in the above-identified patent and that said Letters Patent is hereby corrected as shown below:

On the title page, item [30],

The German Patent Application Number should be corrected to read 196 28 017.

Signed and Sealed this

Seventeenth Day of October, 2000

Attest:

Q. TODD DICKINSON

*Attesting Officer*      *Director of Patents and Trademarks*